United States Patent
Meurer

(10) Patent No.: US 6,203,046 B1
(45) Date of Patent: Mar. 20, 2001

(54) ADAPTOR STRUCTURE FOR TOWING A TRAILER HAVING A PINTLE EYE BEHIND A TRUCK HAVING A FIFTH WHEEL MOUNT

(76) Inventor: Robert Meurer, 1210 Lowater Rd., P.O. Box 27, Chippewa Falls, WI (US) 54729

( * ) Notice: Subject to any disclaimer, the term of this patent is extended or adjusted under 35 U.S.C. 154(b) by 0 days.

(21) Appl. No.: 09/266,816

(22) Filed: Mar. 12, 1999

Related U.S. Application Data

(60) Provisional application No. 60/078,276, filed on Mar. 17, 1998.

(51) Int. Cl.$^7$ .................................................. B62D 53/06
(52) U.S. Cl. ..................................... 280/417.1; 280/441.2
(58) Field of Search ........................... 280/416.1, 417.1, 280/416.2, 441.2, 400, 425.2

(56) References Cited

U.S. PATENT DOCUMENTS

| | | |
|---|---|---|
| 2,910,203 | 10/1959 | Todd . |
| 3,815,936 * | 6/1974 | Oaks, Jr. ........................... 280/417.1 |
| 3,840,252 * | 10/1974 | Jocoy ................................... 280/482 |
| 3,889,978 | 6/1975 | Kann . |
| 4,043,569 | 8/1977 | Ratliff . |
| 4,262,923 | 4/1981 | Weir . |
| 4,433,853 * | 2/1984 | Swaim ............................. 280/417.1 |
| 4,728,114 | 3/1988 | Bills . |
| 4,832,358 | 5/1989 | Bull . |
| 4,874,184 | 10/1989 | Boyer . |
| 4,958,848 | 9/1990 | Nash . |
| 5,211,526 | 5/1993 | Robinette . |
| 5,324,061 * | 6/1994 | Lay .................................... 280/417.1 |
| 5,566,963 | 10/1996 | Johnson . |
| 5,566,964 * | 10/1996 | Leonard ............................ 280/417.1 |
| 5,690,182 | 11/1997 | Ward . |
| 5,797,614 * | 8/1998 | Hord et al. ........................ 280/417.1 |

FOREIGN PATENT DOCUMENTS

| | | |
|---|---|---|
| 1 331 927 | 12/1961 | (FR) . |
| 2641234 * | 7/1990 | (FR) ................................. 280/416.2 |

* cited by examiner

Primary Examiner—Brian L. Johnson
Assistant Examiner—Avraham H. Lerner
(74) Attorney, Agent, or Firm—Edward J. Stemberger

(57) ABSTRACT

Adaptor structure is provided for towing a pintle hitch trailer behind a truck having a fifth wheel ball mount. The adaptor structure includes a mounting plate constructed and arranged to be mounted to a surface of a tongue of a trailer to be towed. The mounting plate includes a mounting tab extending from opposing ends of the mounting plate. Beam structure is provided having first and second ends. The first end is removably coupled to the mounting tabs by a pin connection. The second end includes a fifth wheel ball receptacle constructed and arranged to engage a fifth wheel ball mount of a truck. A tension arm is coupled at one end thereof to the beam structure at a position between the first and second ends of the beam structure. Another end of the tension arm defines a pintle hitch coupler constructed and arranged to engage a pintle eye of the trailer.

10 Claims, 2 Drawing Sheets

ADAPTOR STRUCTURE FOR TOWING A TRAILER HAVING A PINTLE EYE BEHIND A TRUCK HAVING A FIFTH WHEEL MOUNT

This application claims the benefit of U.S. Provisional Application Ser. No. 60/078,276, filed on Mar. 17, 1998.

FIELD OF THE INVENTION

This invention relates to towing a trailer having a pintle eye for connecting to a pintle hook, more particularly, to an apparatus which permits a trailer having a pintle eye to be towed by a truck having a fifth wheel mount arrangement.

BACKGROUND OF THE INVENTION

Generally, trailers having a pintle eye are typically pulled by large trucks having a pintle hook connection which directly engages the pintle eye. Often times, it is desirable to pull a trailer by a three-quarter or one ton truck having a fifth wheel ball mount. Since the ball mount connection is not compatible with trailers having a pintle eye, the user may be required to purchase a trailer which is capable of being coupled to the fifth wheel ball mount on the truck.

Accordingly, there is a need to provide an adaptor structure to permit a trailer having a pintle eye to be pulled by a truck having a fifth wheel mount disposed in the bed of a truck, and to ensure that the adaptor structure is easily removable from the trailer to permit the trailer to be pulled by a vehicle having a pintle hook connection.

SUMMARY OF THE INVENTION

An object of the invention is to fulfill the need referred to above. In accordance with the principles of the present invention, this objective is obtained by providing adaptor structure for towing a pintle hitch trailer behind a truck having a fifth wheel mount. The adaptor structure includes a mounting plate constructed and arranged to be mounted to a surface of a tongue of a trailer to be towed. The mounting plate includes a mounting tab extending from opposing ends of the mounting plate. Beam structure is provided having first and second ends. The first end is removably coupled to the mounting tabs by a pin connection. The second end includes a fifth wheel mount structure constructed and arranged to engage a fifth wheel mount of a truck. A tension arm is coupled at one end thereof to the beam structure at a position between the first and second ends of the beam structure. Another end of the tension arm defines a pintle hitch coupler constructed and arranged to engage a pintle eye of the trailer.

Another object of the invention is to provide a method of removably coupling a trailer having a pintle eye to a truck having a fifth wheel mount. The method includes coupling a mounting plate to a surface of a tongue of the trailer. The mounting plate includes a mounting tab extending from opposing ends of the mounting plate so that the mounting tabs are disposed above the tongue of the trailer. A beam structure is removably coupled at a first end thereof to the mounting tabs by a pin connection. The beam structure has a second end including a fifth wheel mount structure. A tension arm is pivotally coupled at one end thereof to the beam structure at a position between the first and second ends of the beam structure. Another end of the tension arm includes a pintle hitch coupler. The pintle hitch coupler is removably coupled to the pintle eye of the trailer. Finally, the fifth wheel mount structure is coupled to the fifth wheel mount of the truck.

Other objects, features and characteristic of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

DETAILED DESCRIPTION OF THE PRESENTLY PREFERRED EXEMPLARY EMBODIMENT

Figure 1:
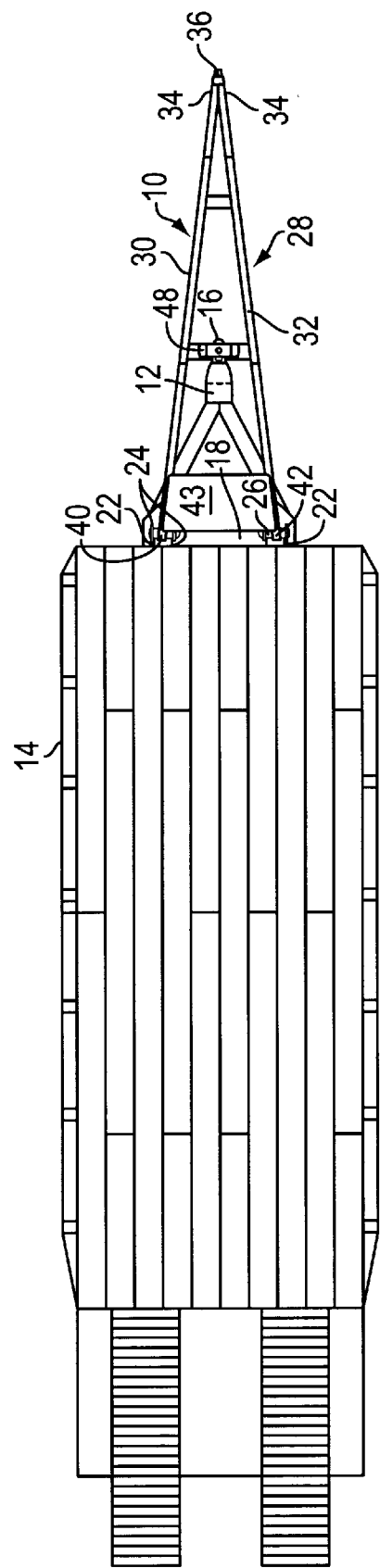
FIG. 1 is a plan view of an adapter structure provided in accordance with the principles of the present invention, shown coupled to a tongue of a trailer having a pintle eye.
Figure 2:
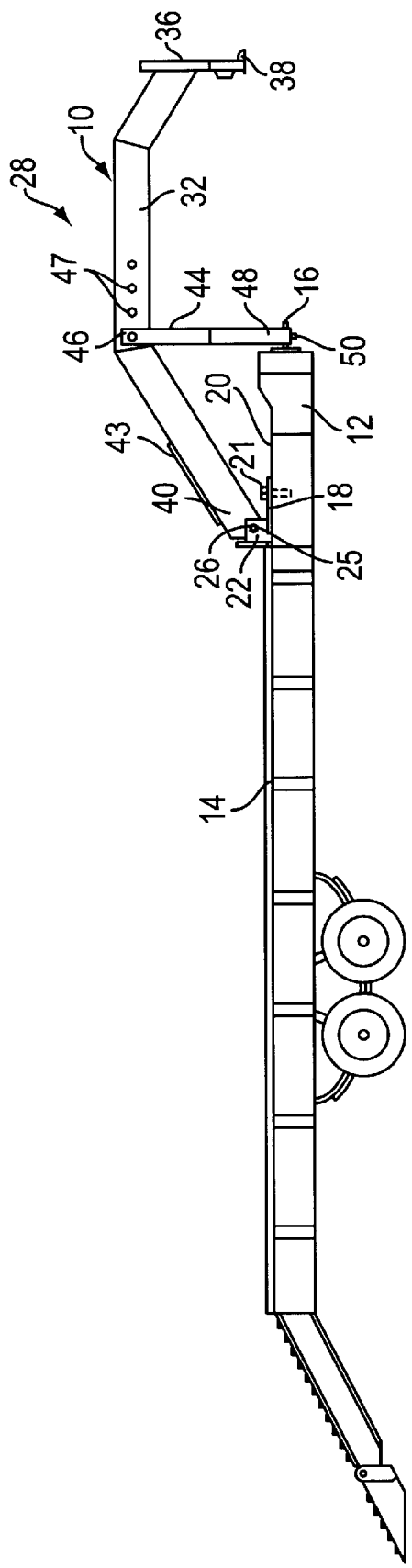
FIG. 2 is a side view of the adaptor structure and trailer of FIG. 1.

With reference to FIGS. 1 and 2, adaptor structure, generally indicated at 10 and provided in accordance with the principles of the present invention, is shown coupled to a tongue 12 of a trailer 14 having a conventional pintle eye 16. The trailer 14 shown is of the flat bed type but may be any trailer having a pintle eye.

The adaptor structure 10 includes a mounting plate 18 having a generally planar surface which is mounted to an upwardly facing surface 20 of the tongue 12 of the trailer 14. In the illustrated embodiment, the mounting plate 18 is securely mounted to the tongue 12 by bolting 21. It is intended that the mounting plate 18 be permanently mounted to the tongue 12. Thus, the mounting plate 18 may be welded to the tongue 12 of the trailer 14.

The mounting plate 18 includes a mounting tab 22 extending upwardly from opposing ends thereof such that the mounting tabs 22 are disposed above the tongue 12 of the trailer 14. Each mounting tab 22 includes a pair of brackets 24 disposed in spaced relation. A bore 25 is defined through each bracket 24 so as to receive a pin 26, the function of which will be explained below.

The adaptor plate 10 also includes beam structure, generally indicated at 28. In the illustrated embodiment, the beam structure 28 comprises a first beam 30 and a second beam 32. Each beam 30 and 32 has a proximal end 34 coupled to a downwardly extending beam 36. An end of the downwardly extending beam 36 includes a fifth wheel mount structure 38. In the illustrated embodiment, the mount structure 38 is in the form of a ball receptacle 38 constructed and arranged to engage a conventional fifth wheel ball mount (not shown) of a truck, preferably of the three-quarter or one ton size. The ball receptacle 38 is conventional and may be, for example, of the type disclosed in U.S. Pat. No. 3,889,978, the contents of which is hereby incorporated in to the present specification by reference. It can be appreciated that the fifth wheel mount structure 38 may be any appropriate structure which may be coupled with a fifth wheel mount of a truck. Thus, the fifth wheel mount structure 38 need not be limited to a ball receptacle.

Each beam 30 and 32 has a distal end 40 having a width less than the spacing between the brackets 24 of the mounting tabs 22. In addition, each distal end 40 of each beam 30 and 32 includes a bore 42 therethrough sized to receive a pin 26 so that the beam structure 28 may be removably coupled to the mounting tabs 22. Thus, each end 40 of each beam 30 and 32 is disposed between an associated pair of brackets 24 and a pin 26 is disposed through the bores 25 in the brackets 24 of an associated mounting tab 22 and through the bore 42 in the associated beam 30 or 32. The pins 26 may be secured with respect to the mounting tabs 22 by a locking pin, bolt or other locking arrangement that is easily removable so that the pins 26 may be quickly and easily removed from the mounting tabs 22 and beams 30 and 32. For added stability, a stabilizing plate 43 is secured by welding or the like so as to join the beams 30 and 32 at their distal ends.

A tension arm 44 is pivotally coupled at one end 46 thereof to the beam structure 28 at a position between the ends of the beam structure 28. The tension arm 44 may be coupled at one of a plurality of locations 47 along the beam structure 28 so as to accommodate trailers having different tongue lengths. The other end of the tension arm 44 extends downwardly and defines a pintle hitch coupler 48 which is constructed and arranged to engage the pintle eye 16 of the trailer 14. The pintle hitch coupler 48 includes a conventional pintle hook, of the type disclosed, for example, in U.S. Pat. No. 4,958,848, the contents of which is hereby incorporated into the present specification by reference. Alternatively, the pintle hitch coupler 38 may be in the form of a pin 50 which may removably couple the tension arm 44 to the pintle eye 16 of the trailer 14.

To couple the trailer 14 having a pintle eye 16 to a fifth wheel ball mount of a truck, the first the end of the beam structure 28 is coupled to the mounting tabs 22 by the pins 26. Then, the pintle hitch coupler 48 is engaged with the pintle eye 16 of the trailer 14. Thereafter, the fifth wheel ball receptacle 38 is engaged with the fifth wheel ball mount of the truck. It is preferable that the ball mount be disposed approximately two to three inches forward of the rear axle of the truck to ensure that when the adaptor apparatus 10 is coupled between the trailer 14 and the truck, the weight of the beam structure 28 is transferred to the rear wheels of the truck. With this type of connection, there is generally no loss of steering or handling of the towing vehicle.

The trailer 14 may be returned to a condition for use with a pintle hook type connection by simply removing the two pins 26 to separate the beam structure 28 from the mounting tabs 22 and by removing the pintle hitch coupler 48 from the pintle eye 16. The mounting plate 18 may remain fixed to the trailer 14.

It can be appreciated that the adaptor structure 10 of the invention provides a cost effective alternative to owning a second trailer having the appropriate connection to be pulled by a fifth wheel truck having a ball mount.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. Adaptor structure for towing a pintle hitch trailer behind a truck having a fifth wheel mount, the adaptor structure comprising:

a mounting plate constructed and arranged to be mounted to a surface of a tongue of a trailer to be towed, the mounting plate including mounting tabs extending from opposing ends of the mounting plate, beam structure having first and second ends, the first end being removably coupled to the mounting tabs by a pin connection, the second end including a fifth wheel mount structure constructed and arranged to engage a fifth wheel mount of a truck, and a tension arm coupled at one end thereof to the beam structure at a position between the first and second ends of the beam structure, another end of the tension arm defining a pintle hitch coupler constructed and arranged to engage a pintle eye of the trailer, wherein the beam structure comprises first and second beams and a generally downwardly extending beam at the second end of the beam structure, each of the first and second beams having proximal and distal ends, each distal end being coupled to an associated mounting tab and each proximal end being coupled to the downwardly extending beam, and wherein each of the mounting tabs includes a pair of brackets disposed in spaced relation, each bracket of a pair of brackets having a bore therethrough such that a pin may extend through the brackets of a pair, each of the distal ends of the first and second beams having a width less than the spacing between two brackets of a pair of brackets, and having a bore therethrough.

2. The adaptor structure according to claim 1, further comprising bolting to couple the mounting plate to the trailer.

3. The adaptor structure according to claim 1, wherein the mounting plate has a generally planar surface constructed and arranged to be mounted to an upwardly facing surface of the tongue of the trailer.

4. The adaptor structure according to claim 1, wherein the one end of the tension arm is pivotally coupled to the beam structure.

5. The adaptor structure according to claim 1, further including a pair of pins, one pin being removably received in the bores in the brackets of one of the pairs of brackets and by the bore in the first beam and the other pin being removably received by the bores in the brackets of the other pair of brackets and by the bore in the second beam.

6. The adaptor structure according to claim 1, wherein an end of said downwardly extending beam includes the fifth wheel mount structure.

7. The adaptor structure according to claim 1, wherein the pintle hitch coupler comprises a pin to removably couple the tension arm to the pintle eye of the trailer.

8. The adaptor structure according to claim 1, wherein the pintle hitch coupler comprising a pintle hook to removably couple the tension arm to the pintle eye of the trailer.

9. The adaptor structure according to claim 1, wherein said fifth wheel mount structure is a ball receptacle constructed and arranged to receive a fifth wheel ball mount.

10. Adaptor structure for towing a pintle hitch trailer behind a truck having a fifth wheel mount, the adaptor structure comprising:

a mounting plate constructed and arranged to be mounted to a surface of a tongue of a trailer to be towed, the mounting plate including mounting tabs extending from opposing ends of the mounting plate, beam structure having first and second ends, the first end being removably coupled to the mounting tabs by a pin connection, the second end including a fifth wheel mount structure constructed and arranged to engage a fifth wheel mount of a truck, and a tension arm coupled at one end thereof to the beam structure at a position between the first and second ends of the beam structure, another end of the tension arm defining a pintle hitch coupler constructed and arranged to engage a pintle eye of the trailer, wherein the beam structure has a plurality of connections along at least a portion of a length thereof with the one end of the tension arm being selectively pivotally coupled to the beam structure at one of the plurality of connections.

\* \* \* \* \*